(12) United States Patent
Chung et al.

(10) Patent No.: US 7,980,724 B2
(45) Date of Patent: Jul. 19, 2011

(54) LAMP GUIDE FRAME, CONNECTING MODULE HAVING THE SAME, BACKLIGHT ASSEMBLY HAVING THE LAMP GUIDE FRAME AND METHOD OF MANUFACTURING THE BACKLIGHT ASSEMBLY

(75) Inventors: Sung-Won Chung, Cheonan-si (KR); Hyun-Su Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 128 days.

(21) Appl. No.: 12/410,620

(22) Filed: Mar. 25, 2009

(65) Prior Publication Data

US 2009/0279281 A1    Nov. 12, 2009

(30) Foreign Application Priority Data

May 9, 2008    (KR) .................. 10-2008-0043314

(51) Int. Cl.
*F21S 4/00*    (2006.01)
*F21V 7/04*    (2006.01)

(52) U.S. Cl. .............. 362/217.14; 362/532; 362/217.08; 362/217.09; 362/225

(58) Field of Classification Search .................. 362/378, 362/532, 534, 97.1, 217.08, 217.09, 217.12, 362/217.13; 439/226, 62.02
See application file for complete search history.

(56) References Cited

U.S. PATENT DOCUMENTS

| 4,708,715 | A | * | 11/1987 | Troutner et al. | ............. 604/6.08 |
|---|---|---|---|---|---|
| 5,013,253 | A | * | 5/1991 | Aiello et al. | .................. 439/235 |
| 7,607,805 | B2 | * | 10/2009 | Kwon et al. | .................. 362/378 |
| 7,612,298 | B2 | * | 11/2009 | Lung et al. | ..................... 174/262 |
| 7,651,354 | B2 | * | 1/2010 | Kim | ............................. 439/226 |
| 2007/0081322 | A1 | * | 4/2007 | Choi et al. | ....................... 362/97 |

FOREIGN PATENT DOCUMENTS

| JP | 2006-171167 A | 6/2006 |
|---|---|---|
| KR | 1020070034678 A | 3/2007 |
| KR | 1020070119872 A | 12/2007 |

* cited by examiner

*Primary Examiner* — Ali Alavi
(74) *Attorney, Agent, or Firm* — Cantor Colburn LLP

(57) ABSTRACT

A lamp guide frame includes a frame body, a plurality of openings and a plurality of lamp socket receiving portions. The frame body guides end portions of a plurality of lamps. The openings extend in a width direction of the frame body. The openings are arranged in a longitudinal direction of the frame body. Each of the lamp socket receiving portions protrudes from a lower face of the frame body partially around an associated opening to form a receiving space receiving a lamp socket inserted into the opening. The lamp socket receiving portions are open in the width direction of the frame body. The frame body and the plurality of lamps socket receiving portions collectively define a single and continuous member. The associated opening and the receiving space of the lamp socket collectively define a continuous opening.

21 Claims, 9 Drawing Sheets

LAMP GUIDE FRAME, CONNECTING MODULE HAVING THE SAME, BACKLIGHT ASSEMBLY HAVING THE LAMP GUIDE FRAME AND METHOD OF MANUFACTURING THE BACKLIGHT ASSEMBLY

This application claims priority to Korean Patent Application No. 2008-43314, filed on May 9, 2008, and all the benefits accruing therefrom under 35 U.S.C. §119, the contents of which are herein incorporated by reference in their entirety.

BACKGROUND OF THE INVENTION

1. Field of the Invention

The present invention relates to a lamp guide frame, a connecting module having the lamp guide frame, a backlight assembly having the lamp guide frame and a method of manufacturing the backlight assembly. More particularly, the present invention relates to a lamp guide frame capable of aligning lamps of a direct-illumination type backlight assembly providing light to a display panel, a connecting module having the lamp guide frame, a backlight assembly having the lamp guide frame and a method of manufacturing the backlight assembly.

2. Description of the Related Art

A backlight assembly employed in a liquid crystal display ("LCD") device is typically classified as either a direct-illumination type backlight assembly or an edge-type backlight assembly according to a position of a light source.

Examples of a light source of a backlight assembly include a cold cathode fluorescent lamp ("CCFL"), and a direct-illumination type backlight assembly including a CCFL includes a lamp socket fixing lamps to a bottom plate of a receiving container. A lamp socket, an electrode part of which is detachably coupled to a terminal of the lamp socket, has been developed so as to allow easily assembly of the lamps to the bottom plate of the receiving container.

Since the backlight assembly requires a plurality of light sources, a plurality of lamp sockets fixing the light sources to a bottom plate of a receiving container, and each of the lamp sockets includes a plurality of separable parts to allow relatively easy assembly of the light sources to the bottom plate, the backlight assembly requires a relatively large number of parts which undesirably increases a volume, an overall weight and costs associated with the backlight assembly. Furthermore, an efficiency of an automatic assembly process of the backlight assembly is deteriorated.

BRIEF SUMMARY OF THE INVENTION

Exemplary embodiments of the present invention provide a lamp guide frame capable of reducing the number of parts and assembly time.

Exemplary embodiments of the present invention also provide a connecting module including the above-mentioned lamp guide frame.

Exemplary embodiments of the present invention also provide a backlight assembly including the above-mentioned lamp guide frame.

Exemplary embodiments of the present invention also provide a method of manufacturing the above-mentioned backlight assembly.

An exemplary embodiment of a lamp guide frame includes a frame body, a plurality of openings and a plurality of lamp socket receiving portions.

The frame body guides end portions of a plurality of lamps. The openings extend in a width direction of the frame body. The openings are arranged in a longitudinal direction of the frame body. Each of the lamp socket receiving portions protrudes from a lower face of the frame body partially around an associated opening to form a receiving space receiving a lamp socket inserted into the opening. The lamp socket receiving portions are open in the width direction of the frame body. The frame body and the plurality of lamps socket receiving portions collectively define a single and continuous member. The associated opening and the receiving space of the lamp socket collectively define a continuous opening.

In an exemplary embodiment, the frame body may include an upper face portion, an inclined portion and a side face portion. The inclined portion downwardly extends from a first edge of the upper face portion in the width direction of the frame body to form an obtuse angle with respect to the upper face portion. The side face portion downwardly extends from a second edge of the upper face portion which opposite to the first edge in the longitudinal direction of the upper face portion to face the lamp socket receiving portion. The opening may extend from the upper face portion to a lower end of the inclined portion of the frame body.

The opening may include a first opening formed through the inclined portion and extended from the lower end of the inclined portion to have a first width in the longitudinal direction of the frame body greater than a diameter of the lamp and smaller than a width of the lamp socket in the longitudinal direction of the frame body, and a second opening extended from the upper face portion to the inclined portion to have a second width greater than the width of the lamp socket and to be connected to the first opening. The first and second openings define a continuous opening.

The lamp socket receiving portion may include a rear wall and sidewalls. The rear wall protrudes from a lower face of the upper face portion substantially in parallel with the side face portion. The sidewalls protrudes from a lower face of the inclined portion to face each other and are connected to side edges of the rear wall, the associated opening being between the sidewalls.

The lamp socket receiving portion may be open only in a direction toward the inclined portion, and the lamp socket receiving portion may further include a bottom wall connected to a lower end of the rear wall and lower ends of the sidewalls to support the lamp socket. Alternatively, the lamp socket receiving portion may be downwardly open, and the lamp socket receiving portion may further include a front wall that faces the rear wall and is connected to the sidewalls. The lamp guide frame may further include a coupling part formed on at least one of the rear wall and the sidewalls to fix the lamp socket.

An exemplary embodiment of a connecting module includes a lamp guide frame and a lamp socket.

The lamp guide frame includes a frame body, a plurality of lamp socket receiving portions, a plurality of lamp socket receiving portions and a plurality of openings. Each of the lamp socket receiving portions protrudes from a lower face of the frame body to form a receiving space. Each lamp socket receiving portion is open in a direction in which the lamp socket receiving portion is coupled to a power supply board providing lamp-driving power. Each of the openings is formed through the frame body corresponding to the lamp socket receiving portion to expose the receiving space of the lamp socket receiving portion. The lamp socket includes a socket body and a power supply member. The socket body is received in the lamp socket receiving portion through an associated opening. The power supply member is coupled to the socket body, and includes a power output terminal detachably coupled to an electrode part of a lamp inserted into the associated opening and a power input terminal exposed from the socket body in the coupling direction of the power output terminal and the electrode part of the lamp.

In an exemplary embodiment, the frame body may include an upper face portion, an inclined portion and a side face portion. The upper face portion includes a stepped portion. The inclined portion extends from a first edge of the upper face portion in a width direction of the frame body to form an obtuse angle with respect to the upper face portion. The opening extends to a lower end of the inclined portion. The side face portion downwardly extends from a second edge of the upper face portion which is opposite to the first edge in the width direction of the frame body to face the lamp socket receiving portion.

The lamp socket receiving portion may include a rear wall and sidewalls. The rear wall protrudes from a lower face of the upper face portion substantially in parallel with the side face portion. The rear wall is more downwardly protrusive than the side face portion and the inclined portion. The sidewalls protrude from a lower face of the inclined portion to face each other and are connected to side edges of the rear wall. The opening is between the sidewalls.

The lamp socket receiving portion may expose the power input terminal in a direction toward the inclined portion. Alternatively, the lamp socket receiving portion may downwardly expose the power input terminal.

An exemplary embodiment of a backlight assembly includes a receiving container, a lamp guide frame, a plurality of lamp sockets and a plurality of lamps.

The receiving container includes a bottom plate, a plurality of extracting holes extended through an edge portion of the bottom plate, and a sidewall portion extending from the edge portion of the bottom plate. The lamp guide frame includes a frame body disposed along the sidewall portion, and a plurality of lamp socket receiving portions each of which protrudes from a lower face of the frame body to be inserted into an associated extracting hole and open to an upper side by an opening formed through the frame body. The lamp sockets include a socket body downwardly received in a lamp socket receiving portion from the upper side, and a power supply member including a power output terminal exposed to the upper side of the frame body from the socket body and a power input terminal exposed to the socket body protruding from a rear face of the bottom plate of the receiving container. Each of the lamps includes a lamp tube, an end portion of which is disposed over the socket body, and an electrode part formed at the end portion and detachably inserted into the power output terminal.

In an exemplary embodiment, the frame body may include an upper face portion, an inclined portion and a side face portion. The upper face portion is substantially in parallel with the bottom plate. The upper face portion includes a stepped portion. The inclined portion extends from a first edge of the upper face portion in the width direction of the frame body. A lower end of the inclined portion is disposed on the bottom plate. The opening extends from the upper face portion to the lower end of the inclined portion. The side face portion extends from a second edge of the upper face portion which is opposite to the first edge of the upper face portion to face the sidewall portion.

The lamp socket receiving portion may include a rear wall and sidewalls. The rear wall protrudes from a lower face of the upper face portion substantially in parallel with the side face portion to be inserted into the extracting hole. The sidewalls protrude from a lower face of the inclined portion to face side faces of the socket body and to be inserted into the extracting hole.

The backlight assembly may further include a power supply board including a connection terminal disposed on the rear face of the bottom plate and contacting the power input terminal of the lamp socket. The connection terminal may be inserted into the lamp socket receiving portion from a direction facing the rear wall to make contact with the power input terminal. Alternatively, the power input terminal may protrude toward a lower side of the lamp socket receiving portion to be inserted into a connection hole of the power supply board including the connection terminal.

The backlight assembly may further include a coupling protrusion formed on the side face portion, and a coupling hole formed through the sidewall portion. The coupling protrusion is inserted into the coupling hole.

An exemplary embodiment provides a method of manufacturing a backlight assembly. A lamp guide frame including a frame body including openings and a plurality of lamp socket receiving portions each of which protrudes from a lower face of the frame body to be upwardly open by an associated opening formed through the frame body is downwardly positioned in a receiving container from an upper side of the receiving container so that the lamp socket receiving portions are inserted into extracting holes formed through a bottom plate of the receiving container.

A lamp socket including a socket body and a power supply member including a power output terminal exposed to an upper side of the frame body from the socket body and a power input terminal exposed to a side of the socket body is downwardly inserted into the lamp socket receiving portion from the upper side of the frame body. Thereafter, a lamp including a lamp tube and an electrode part formed at an end portion of the lamp tube is downwardly coupled to the lamp socket from the upper side of the frame body so that the electrode part is detachably coupled to the power output terminal.

A power supply board including a connection terminal formed on an edge portion to output lamp-driving power may be positioned on a rear face of the bottom plate so that the connection terminal makes contact with the power input terminal that is exposed through the lamp socket receiving portion protruding from the rear face of the bottom plate.

In exemplary embodiments of the lamp guide frame, a connecting module including the lamp guide frame, a backlight assembly including the lamp guide frame and a method of manufacturing the backlight assembly, since a plurality of lamp sockets is coupled to a lamp guide frame, a separate aligning member for aligning the lamp sockets may be advantageously omitted.

In addition, the backlight assembly may be assembled and simplified in a top-down method, to advantageously allow easily assembly of the backlight assembly and reduce assembly time.

BRIEF DESCRIPTION OF THE DRAWINGS

The above and other features and advantages of the present invention will become more apparent by describing in detailed exemplary embodiments thereof with reference to the accompanying drawings.

DETAILED DESCRIPTION OF THE INVENTION

Figure 1:
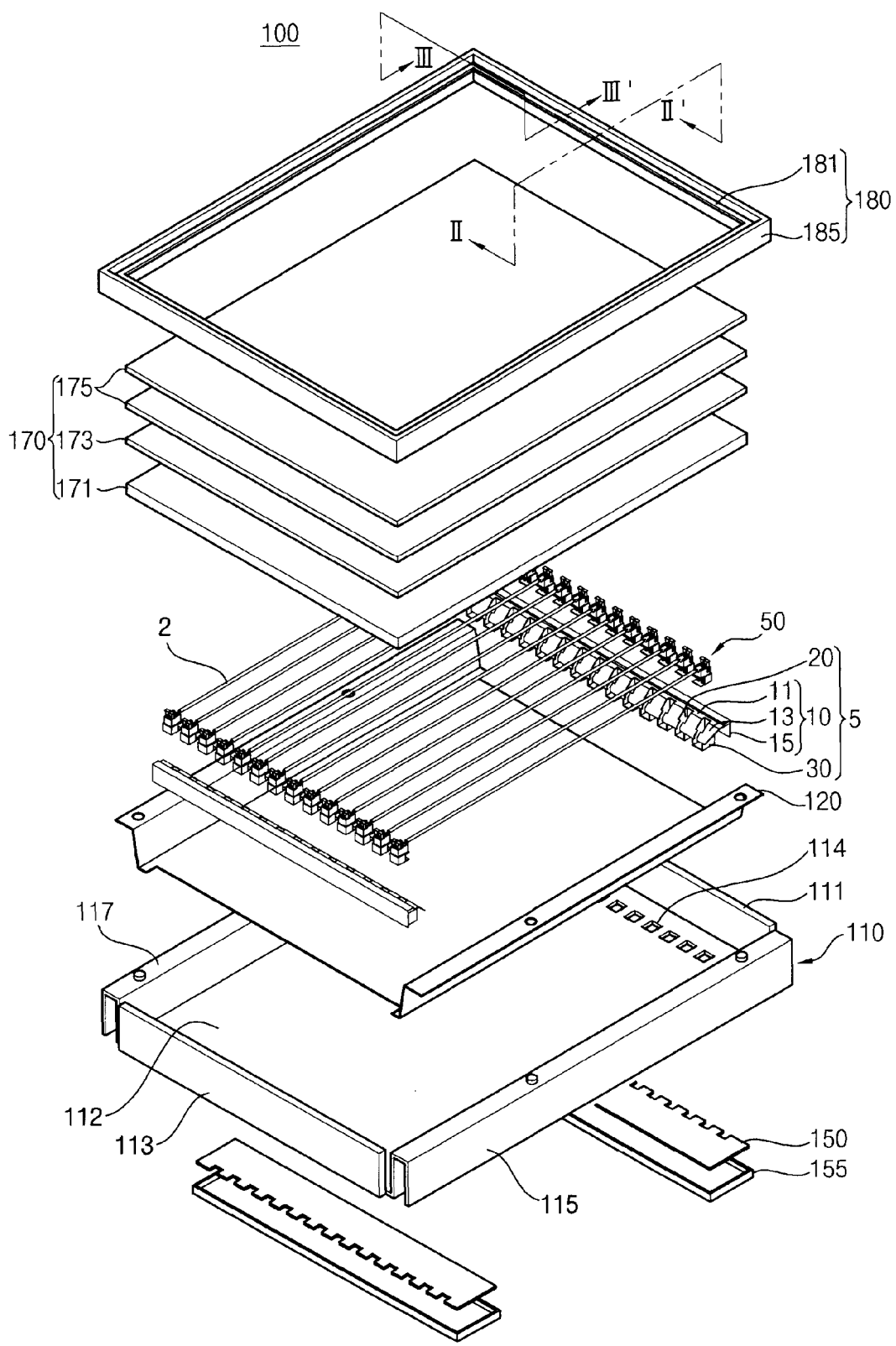
FIG. 1 is an exploded perspective view illustrating an exemplary embodiment of a backlight assembly according to the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 2:
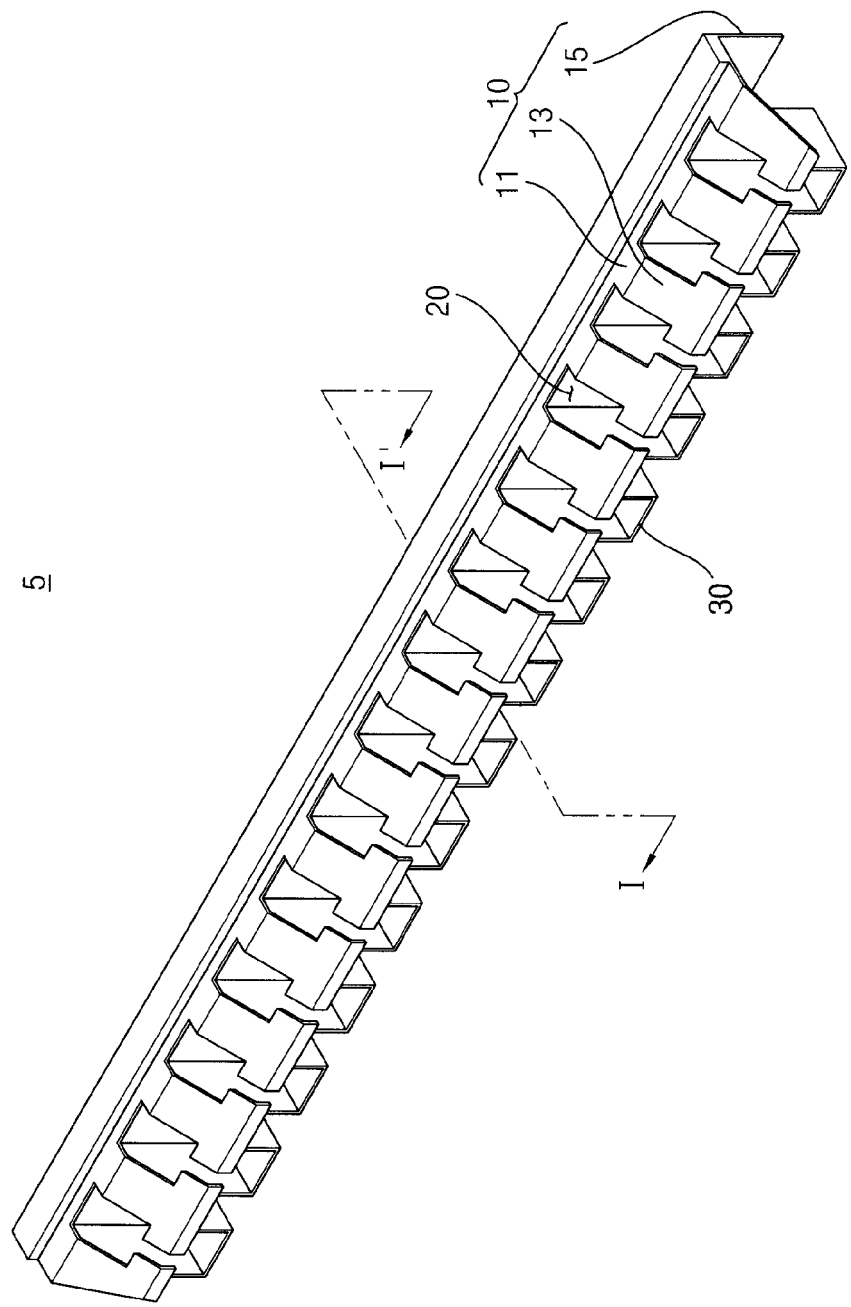
FIG. 2 is a perspective view illustrating an exemplary embodiment of a lamp guide frame illustrated in FIG. 1.

FIG. 1 is an exploded perspective view illustrating an exemplary embodiment of a backlight assembly according to the present invention. FIG. 2 is a perspective view illustrating an exemplary embodiment of a lamp guide frame illustrated in FIG. 1.

Referring to FIGS. 1 and 2, a backlight assembly 100 includes a receiving container 110, a lamp guide frame 5, a plurality of a lamp socket 50 and a plurality of a lamp 2.

The backlight assembly 100 may be employed in a flat panel display device such as a liquid crystal display ("LCD") device, and provides light to a display panel such as an LCD panel to display images. The receiving container 110 receives the lamp guide frame 5, the lamp sockets 50 and the lamps 2. In an exemplary embodiment, the receiving container 110 may also be referred to as a chassis, and may include metal. The receiving container 110 includes a bottom plate 112 and a sidewall portion.

The sidewall portion includes first, second, third and fourth sidewalls 111, 113, 115 and 117. The first sidewall 111 upwardly extends from the first edge portion of the bottom plate 112. The second sidewall 113 upwardly extends from the second edge portion of the bottom plate 112. The third sidewall 115 and the fourth sidewall 117 face each other, and are disposed substantially perpendicular to the first sidewall 111 and the second sidewall 113. The sidewall portion and the bottom plate 112 of the receiving container 110 define a receiving space.

A plurality of a combining member 114 is formed through first and second edge portions of the bottom plate 112. Each of the combining members 114 may be formed completely through the bottom plate 112 of the receiving container 110, such that the combining members 114 are accessible and open from both a top surface and a bottom surface of the bottom plate 112. Alternatively, the combining members 114 may be formed partially through the bottom plate 112, and be accessible and open from only the top or only the bottom surface of the bottom plate 112. A combining member 114 may hereinafter be referred to as an extraction hole.

The first and second edge portions of the bottom plate 112 of the receiving container 110 are disposed opposite to each other relative to a central portion of the bottom plate 112. The extracting holes 114 are disposed in the bottom plate 112 proximate to the first sidewall 111 and the second sidewall 113, substantially in a line (e.g., linearly), and parallel to a longitudinal direction of the first and second sidewalls 111 and 113. The combining members 114 may be disposed separated at a distance from the first and/or second sidewalls 111 and 113.

The lamp guide frame 5 is disposed at inner sides of the first sidewall 111 and the second sidewall 113. The lamp guide frame 5 is disposed at an inner side of the first sidewall 111 in substantially a same manner and method as that of the lamp guide frame 5 disposed at an inner side of the second sidewall 113. Thus, the disposition configuration and method of the lamp guide frame 5 at the inner side of the first sidewall 111 will be described in detail.

The lamp guide frame 5 receives and protects end portions of the lamps 2, and arranges the lamps 2 at regular intervals along a transverse direction of the receiving container 110 substantially perpendicular to a longitudinal direction of the receiving container 110. In an exemplary embodiment, the lamp guide frame 5 may include a single, continuous and indivisible member formed of plastic, such as by casting. In one exemplary embodiment, the lamp guide frame 5 may be formed by a plastic casting method using a mold.

As used herein, a direction from the receiving container 110 toward the lamp 2 is defined as an upper direction, and a direction from the lamp 2 toward the receiving container 110 is defined as a lower direction.

The lamp guide frame 5 includes a frame body 10, a plurality of openings 20 and a plurality of lamp socket receiving portion 30.

The frame body 10 is extended in the transverse direction of the receiving container 110 and substantially parallel along the first sidewall 111 of the receiving container 110 described later.

The openings 20 are extended upwardly and downwardly (e.g., vertically) in a direction substantially perpendicular to a plane of the bottom plate 112 of the receiving container 110. The openings 20 in the frame body 10 substantially penetrate through the frame body 10 in the vertical direction. An inner area of the openings 20 is accessible through an opened upper side of the frame body 10. The inner area of the openings 20 may not be accessible from a lower side of the frame body 10, as illustrated in FIGS. 1 and 2.

The openings 20 are extended in a horizontal direction, e.g., in a width direction, substantially perpendicular to the vertical direction from an inner side portion of the frame body 10 (e.g. disposed towards the central portion of the bottom plate 112) to an outer side portion of the frame body 10. The inner area of the openings 20 is accessible through an opened inner side of the frame body 10. The inner area of the openings 20 may not be accessible from an outer side of the frame body 10, as illustrated in FIGS. 1 and 2.

The openings 20 are disposed spaced apart from each other at substantially regular intervals in a longitudinal direction of the frame body 10, or in the transverse direction of the receiving container 110. The spacing of the openings 20 may correspond in dimension and/or or positional placement of the lamps 2, as each of the openings of the frame body 10 is disposed relative to one lamp 2.

Each lamp socket receiving portion 30 downwardly protrudes towards the lower side of the frame body 10, and may define a lower face of the frame body 10. Each lamp socket receiving portion 30 closes an openings 20 at the lower side and the outer side of the frame body 10, such that the lamp socket receiving portion 30 is considered to be disposed around an associated opening 20 of the frame body 10. The lamp socket receiving portion 30, the opened inner side of the frame body 10 and the opened upper side of the frame body 10 define a receiving space of the opening 20 which receives the lamp socket 50 inserted into the opening 20.

The lamp socket receiving portion 30 is open at an inner side of the frame body 10 such that the receiving space of the opening 20 is accessible through the opened inner side, and exposes a power input terminal of the lamp socket 50 disposed at the inner side of the frame body 10. The lamp socket receiving portion 30 is formed as single, continuous and indivisible unit with remaining portions of the frame body 10.

Hereinafter, a shape of the lamp guide frame 5 will be described in detail.

Figure 3:
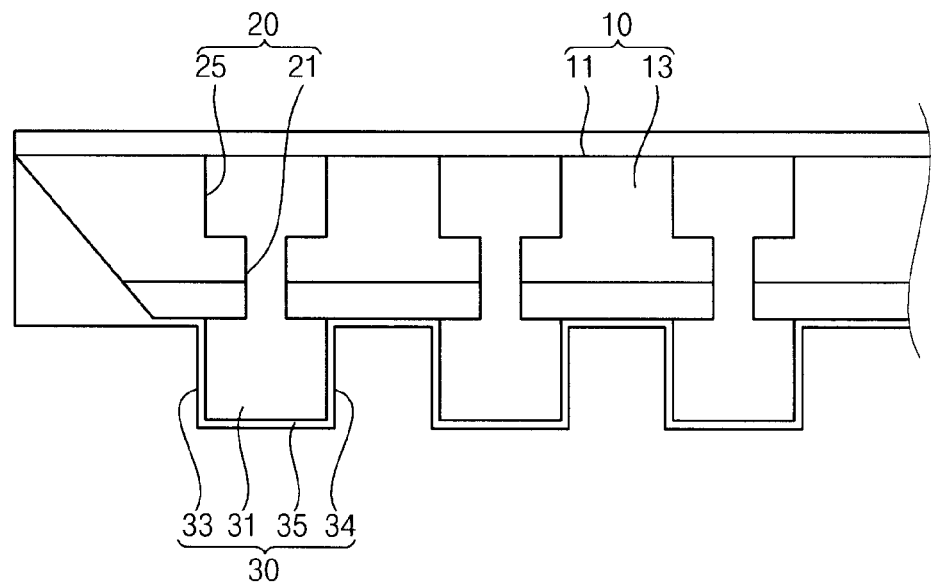
FIG. 3 is a side view illustrating the lamp guide frame illustrated in FIG. 2.

FIG. 3 is a cross-sectional view taken along line I-I' in FIG. 2.

Referring to FIGS. 2 and 3, the frame body 10 may include an upper face portion 11, an inclined portion 13 and a side face portion 15.

Figure 4:
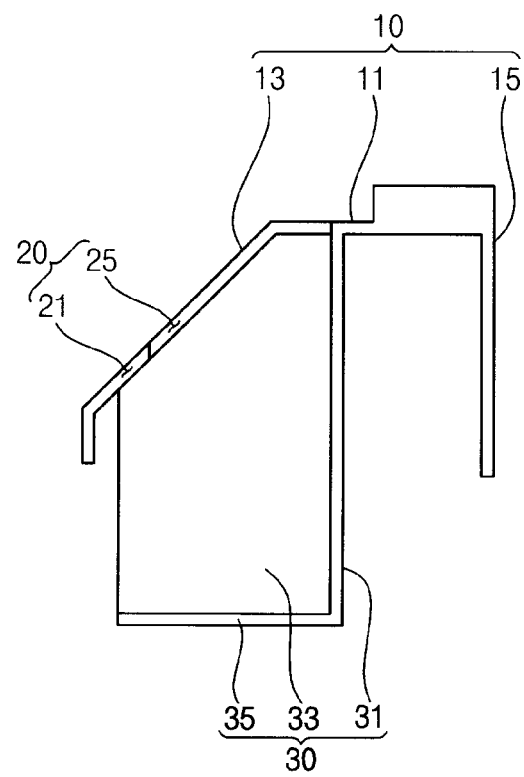
FIG. 4 is a cross-sectional view taken along line I-I' in FIG. 2.

The upper face portion 11 corresponds to an upper end of the frame body 10, and may be disposed substantially parallel with the bottom plate 112 of the receiving container 110. As best illustrated in FIGS. 2 and 4, the upper face portion 11 may include a stepped portion such as to support, contact and/or guide an optical member.

The inclined portion 13 downwardly extends from a first edge of the upper face portion 11 in the width direction of the frame body 10. The inclined portion 13 forms an obtuse angle with respect to the upper face portion 11, and a lower end of the inclined portion 13 is bent substantially perpendicular to the upper face portion 11 and to the plane of the bottom plate 112 of the receiving container 110.

The side face portion 15 downwardly extends from a second edge opposite to the first edge of the upper face portion 11. The side face portion 15 is disposed substantially perpendicular to the upper face portion 11, and faces the inclined portion 13 so that the lamp socket receiving portion 30 is positioned between the side face portion 15 and the inclined portion 13.

The side face portion 15 and the inclined portion 13 have a substantially similar length in a vertical direction from the upper face portion 11, such that a lower edge of the side face portion 15 and the inclined portion 13 are disposed at a same distance taken perpendicularly from the upper portion 11. Alternatively, the side face portion 15 may downwardly extend further that the inclined portion 13, and the lower edge of the side portion 15 is disposed further from the upper portion 11 than the inclined portion 13.

FIG. 4 is a side view illustrating the lamp guide frame illustrated in FIG. 2.

As shown in FIG. 4, when the inclined portion 13 of the frame body 10 is viewed in a side direction, the opening 20 extends corresponding from the upper face portion 11 to a lower end of the inclined portion 13. The opening 20 is continuous from the upper face portion 11 to a lower end of the inclined portion 13, and provides a passage through which one of two end portions of a lamp 2 is coupled to the lamp socket 50 received in the lamp socket receiving portion 30.

The opening 20 includes a first opening 21 and a second opening 25. The first opening 21 is formed completely through a thickness of the inclined portion 13. The first opening 21 extends from the lower end of the inclined portion 13 and meets a lower end of the second opening 25. The first opening 21 has a first width greater than a diameter of the lamp 2 and smaller than a width of the lamp socket 50, the diameter and the width taken in the transverse direction of the receiving container 110. In addition, the second opening 25 is formed completely through the thickness of the inclined portion 13. The second opening 25 extends from the upper face portion 11 and meets the first opening to have a second width greater than the width of the lamp socket 50. The second opening 25 is considered to be connected to the first opening 21, such that the first opening 21 and the second opening 25 are disposed continuously from the upper face portion 11 to a lower end of the inclined portion 13.

Referring to FIGS. 3 and 4, the lamp socket receiving portion 30 downwardly extends longer than the inclined portion 13 and the side face portion 15. In the illustrated exemplary embodiment, about half of the lamp socket receiving portion 30 is disposed below the inclined portion 13 and the side face portion 15. Accordingly, the lamp socket 50 received in the lamp socket receiving portion 30 may be partially exposed, e.g., not covered by the inclined portion 13 and the side face portion 15. The exposed portion of the lamp socket 50 may be accessible from the opened inner side of the frame body 10.

The lamp socket receiving portion 30 may include a rear wall 31, and sidewalls 33 and 34 forming a space in the lamp socket receiving portion 30 receiving the lamp socket 50.

Referring to FIG. 4, the rear wall 31 protrudes from the lower face of the upper face portion 11 substantially in parallel with the side face portion 15. In one exemplary embodiment, the rear wall 31 may protrude from an edge of the upper face portion 11 further than the side face portion 15.

The two sidewalls 33 and 34 protrude from a lower face of the inclined portion 13 and face each other. The opening 20 is disposed between the two sidewalls 33 and 34 of the lamp socket receiving portion 30. The sidewalls 33 and 34 are spaced apart from an edge of the inclined portion 13 formed due to the opening 20, and are protrude further from the lower face of the inclined portion 13 towards the bottom wall 35 than the inclined portion 13 and the side face portion 15. The sidewalls 33 and 34 are respectively connected to side edges of the rear wall 31.

The lamp socket receiving portion 30 may further include a bottom wall 35. The bottom wall 35 may be connected to each of a lower end of the rear wall 31 and lower ends of the sidewalls 33 and 34 to support the lamp socket 50.

In an exemplary embodiment, a coupling part (not shown) coupled to the lamp socket 50, such as a catching hole or a catching protrusion, may be formed on at least one of the rear wall 31 and the sidewalls 33 and 34 of the lamp socket receiving portion 30 to securely receive and fix the lamp socket 50.

In an exemplary embodiment, the lamp socket receiving portion 30 may be open in a direction from the side face portion 15 toward the inclined portion 13 (hereinafter referred to as "front direction"), such as from right to left in the view of FIG. 4. Advantageously, a portion of the lamp socket 50 received in the lamp socket receiving portion 30 may be exposed in the front direction at a lower position in the frame body 10, in comparison with the inclined portion 13. An inner area of the lamp socket receiving portion 30 is accessible through this exposed front direction area, at the opened inner side of the frame body 10, similar to the manner in which the inner area of the openings 20 is accessible. The inner area of the lamp socket receiving portion 30 may not be accessible from an outer side of the frame body 10, also similar to the openings 20, such as illustrated in FIGS. 1 and 2.

As shown in the illustrated embodiments of to the lamp guide frame 5 in FIGS. 2-4, the lamp sockets 50 may be inserted into the lamp socket receiving portion 30 and aligned, and the lamp sockets 50 may be partially exposed and make direct contact with a connection terminal of a power supply board. Advantageously, a separate member such as an alignment plate aligning the lamp sockets 50 may be omitted, the light sources remain relatively easy to assemble to the receiving container 110, and the backlight assembly requires less parts which decreases an overall weight and costs associated with the backlight assembly. Furthermore, an efficiency of an automatic assembly process of the backlight assembly is improved since lamp socket receiving portion 30 of the lamp guide frame 5 is s single and continuous unit further reducing the number of parts of the backlight assembly.

Figure 5:
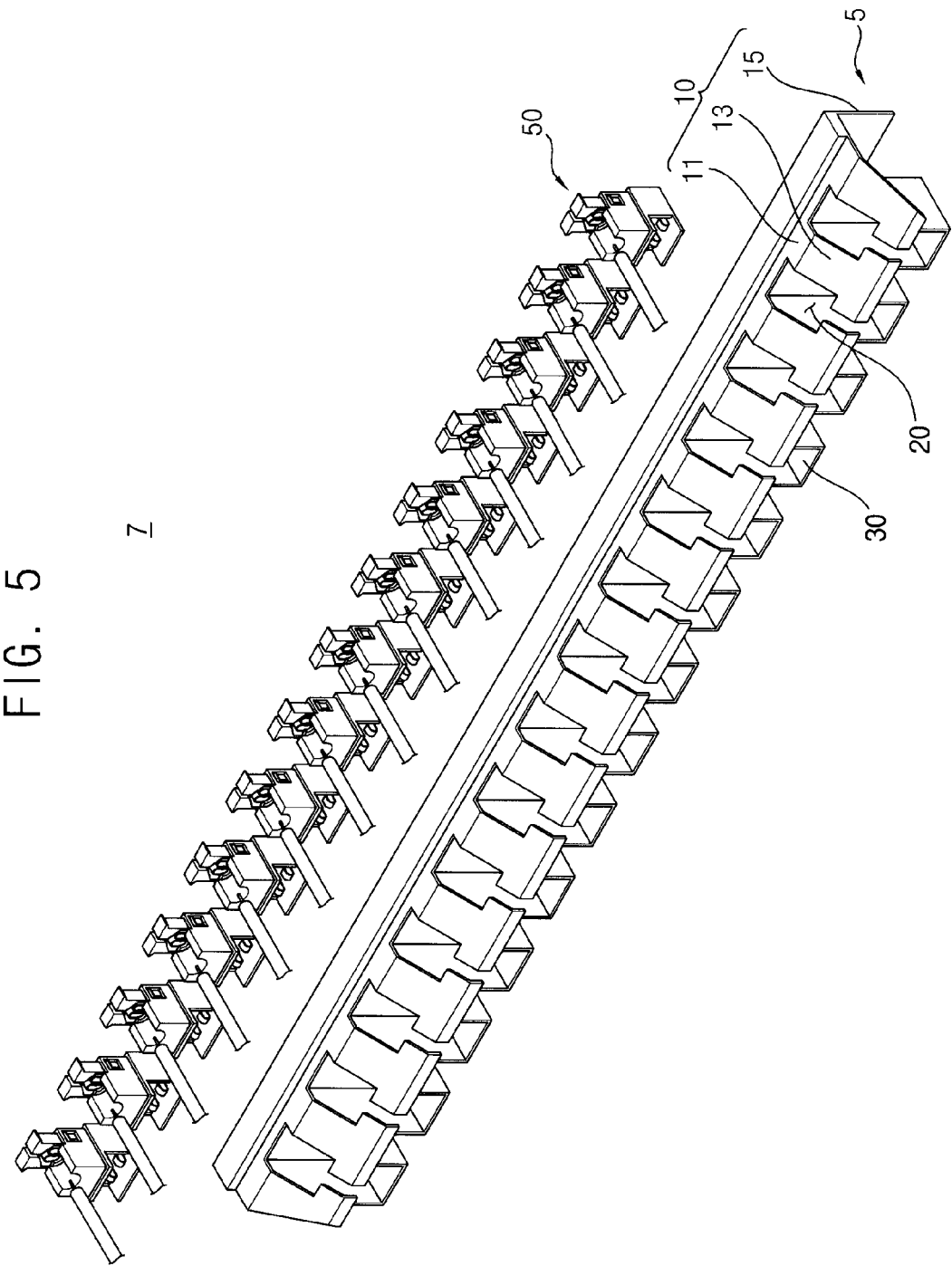
FIG. 5 is an exploded perspective view illustrating an exemplary embodiment of a connecting module including the lamp guide frame illustrated in FIGS. 2 to 4.

FIG. 5 is an exploded perspective view illustrating an exemplary embodiment of a connecting module including the lamp guide frame illustrated in FIGS. 2 to 4.

Referring to FIG. 5, a connecting module 7 includes the lamp guide frame 5 and the lamp socket 50.

The lamp socket 50 is received in the lamp socket receiving portion 30 through the opening 20 in a direction from up to down (hereinafter referred to as "top-down method"). Since the second opening 25 has the second width greater than the width of the lamp socket 50, and since the opening 20 is continuous from the second opening 25 at a top of the frame body 10 of the lamp guide frame 5, through an area disposed between the sidewalls 33 and 34 of the lamp socket receiving portion 30, and to the bottom wall 5 of the lamp socket receiving portion 30, the lamp socket 50 may be relatively easily inserted in the top-down method.

Figure 6:
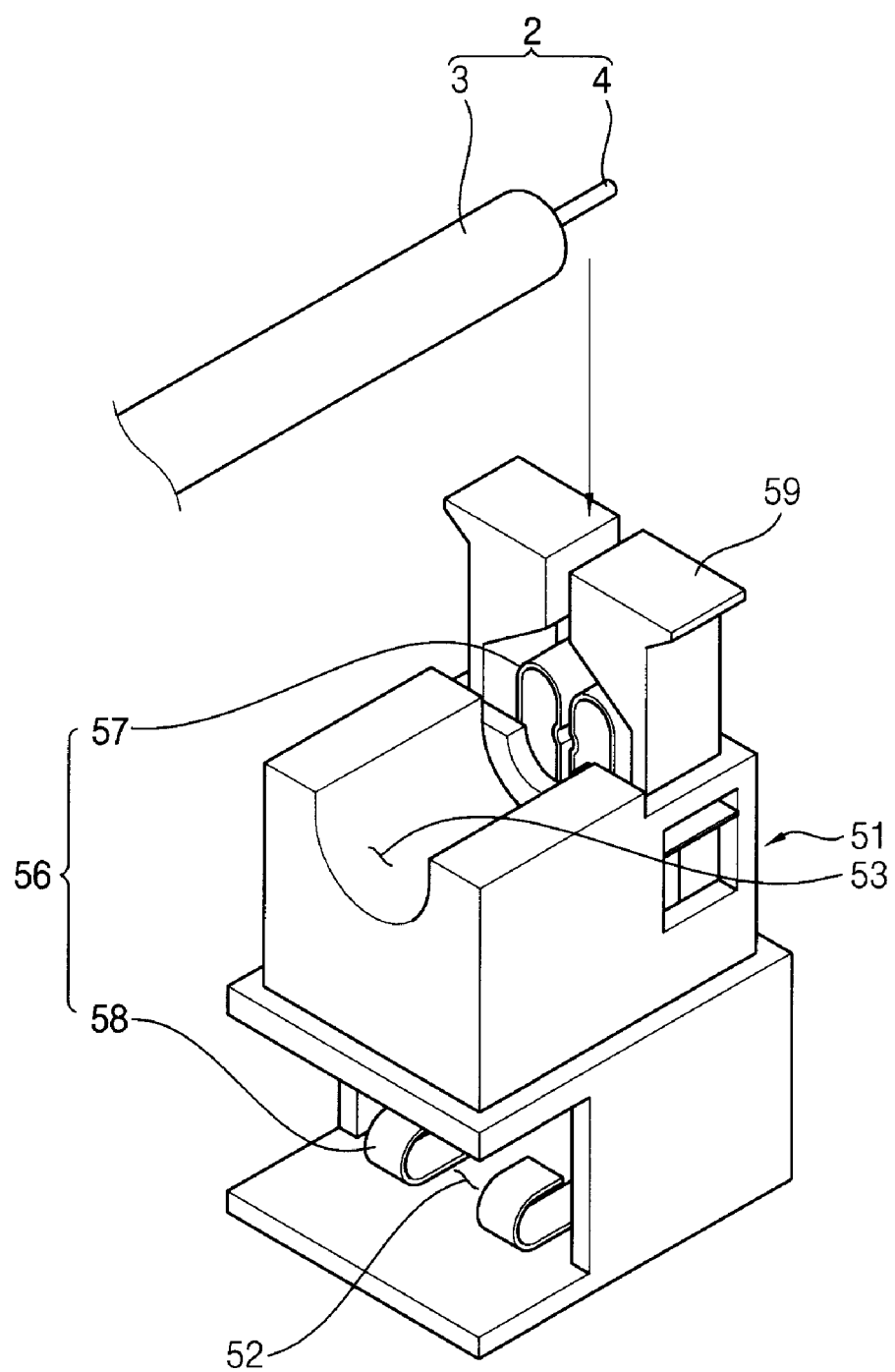
FIG. 6 is a perspective view illustrating an exemplary embodiment of a lamp socket illustrated in FIG. 5.

FIG. 6 is a perspective view illustrating an exemplary embodiment of a lamp socket illustrated in FIG. 5.

Referring to FIG. 6, the lamp 2 includes a lamp tube 3 and an electrode part 4. The lamp tube 3 may include a glass tube and a fluorescent layer coated on an inner wall of the glass tube. The electrode part 4 may include a discharge electrode and a lead. The discharge electrode is disposed in the lamp tube 3, and the lead externally extends from the discharge electrode through an end portion of the lamp tube 3. In an exemplary embodiment, the lamp 2 may correspond to an internal electrode fluorescent lamp. Alternatively, the lamp 2 may correspond to an external electrode fluorescent lamp ("EEFL").

The lamp socket 50 is coupled to the electrode part 4 formed at the end portion of the lamp tube 3 such as shown by the down arrow in FIG. 6, and supplies lamp-driving power to the electrode part 4. The lamp socket 50 includes a socket body 51 and a power supply member 56.

In an exemplary embodiment, the socket body 51 may include plastic and/or formed by casting. The socket body 51 may have a substantially hexahedral shape. A lamp guide groove 53 is formed on a first portion of the socket body 51 to guide an end portion of the lamp 2. A terminal opening 52 is formed a second portion of the socket body 51 and is opened to a side of the socket body 51.

The power supply member 56, which may include metal, supplies the lamp-driving power provided from a power supply board 150 (FIG. 1), such as an inverter, to the electrode part 4 of the lamp 2. The power supply member 56 is inserted into the terminal opening 52 to be fixed in the socket body 51. The power supply member 56 includes a power output terminal 57 and a power input terminal 58.

A first end portion of the lamp tube 3 is disposed on the socket body 51 disposed at the first sidewall 111 (refer to FIG. 1), and a second end portion of the lamp tube 3 is disposed on the socket body 51 disposed at the second sidewall 113. A single lamp tube 3 is disposed on a plurality of the socket body 51, such as illustrated in FIG. 1. The power output terminal 57 is exposed to an area above the socket body 51 as shown in FIG. 6, and may have a clamp shape. The electrode part 4 of the lamp 2 is detachably inserted into the power output terminal 57 by the top-down method, as shown by the down arrow.

The power input terminal 58 is exposed to the side of the socket body 51, the side facing the central portion of the receiving container 110. The power input terminal 58 may make direct contact with a connection terminal of the power supply board 150. In an exemplary embodiment, the power input terminal 58 may include a leaf spring to make contact with the connection terminal of the power supply board 150 by an elastic deformation.

Figure 7:
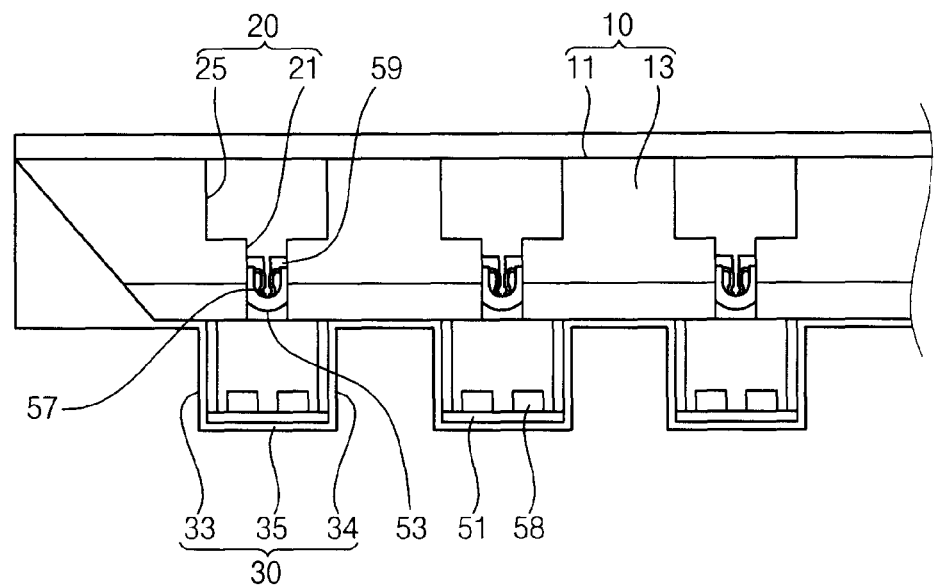
FIG. 7 is a side view illustrating the connecting module illustrated in FIG. 5.

FIG. 7 is a side view illustrating the connecting module illustrated in FIG. 5.

Referring to FIG. 7, the lamp socket 50 is received in the lamp socket receiving portion 30 so that the lamp guide groove 53 faces the inclined portion 13 of the lamp guide frame 5.

The power input terminal 58 is disposed in the lamp socket receiving portion 30 that is disposed further downward than a lower edge of the inclined portion 13, and exposed in the front direction view in FIG. 7. Advantageously, the connection terminal of the power supply board 150 may be relatively easily inserted into the lamp socket receiving portion 30 from the front toward the rear and make contact with the power input terminal 58 exposed at a lower side of the lamp socket receiving portion 30.

The lamp socket 50 may further include a socket cap 59 as shown in FIGS. 6 and 7. The socket cap 59 is removably inserted into the terminal opening to upwardly and downwardly move over the socket body 51. Before the electrode part 4 of the lamp 2 is inserted into the power output terminal 57, the socket cap 59 is left unpushed, e.g., in an upward position. When the electrode part 4 of the lamp 2 is inserted into the power output terminal 57, the socket cap 59 is downwardly pushed by an external force and compresses the power output terminal 57 to secure contact between the power output terminal 57 and the electrode part 4.

The above-described lamp socket 50 is an exemplary embodiment of the lamp socket 50 included in the connecting module 7 according to the present invention. In alternative embodiments, so long as the lamp socket 50 may be detachably coupled to the electrode part 4 of the lamp 2 in the top-down method, the shapes of the socket body 51 and the power supply member 56 of the lamp socket 50 may be variously modified, and/or the socket cap 59 may be omitted.

The connecting module 7 guides and fixes the lamps 2, and electrically connects the power supply board 150 and the lamp 2 to each other. Advantageously, the connecting module 7 may have multiple functions to further reduce the number of parts which decreases the overall weight and costs associated with the backlight assembly, and increases the efficiency of an automatic assembly process of the backlight assembly.

Figure 8:
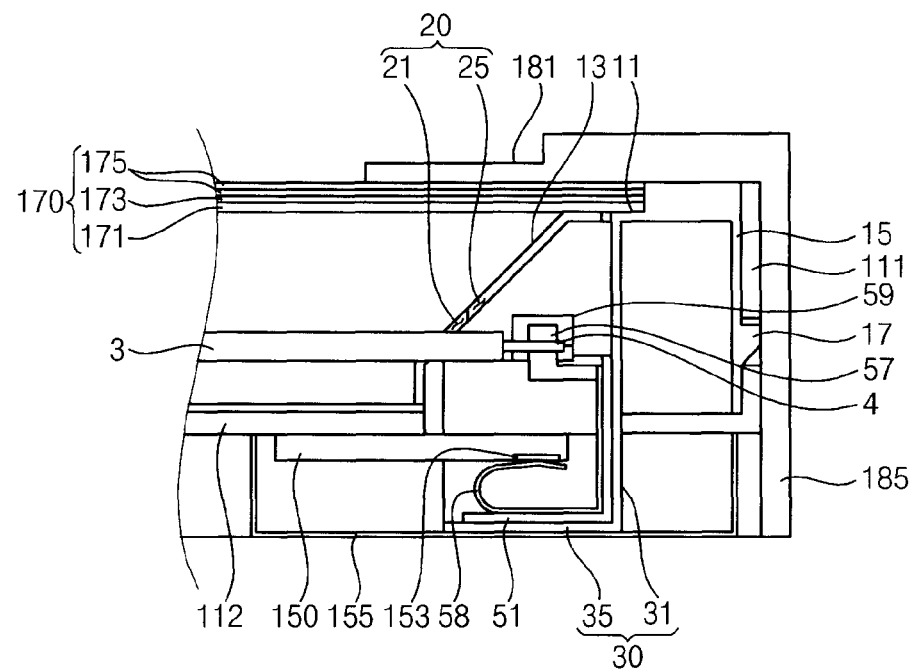
FIG. 8 is a cross-sectional view taken along line II-II' in FIG. 1.

FIG. 8 is a cross-sectional view taken along line II-II' in FIG. 1.

Referring to FIGS. 1 and 8, the side face portion 15 of the frame body 10 is disposed facing the inner side face of the first sidewall 111 of the receiving container 110. A coupling protrusion 17 is formed on an outer side of the side face portion 15, and a coupling hole into which the coupling protrusion 17 is inserted may be formed at the sidewall portion of the receiving container 110. Each of a plurality of a the coupling protrusion 17 may extend from the side face portion 15 of a respective frame body 10, and toward the first sidewall 111 and the second sidewall 113, respectively, as shown in FIGS. 1 and 8. Each of the coupling protrusion 17 is formed continuously with a remainder of portions of the frame body 10, such that the frame body 10 is a single and indivisible unit.

Each lamp socket receiving portion 30 protrudes from the upper face portion 11 of the frame body 10 and the lower face of the inclined portion 13, and is inserted into the extracting hole 114 formed through the bottom plate 112 of the receiving container 110, such as by the top-down method. The lamp socket receiving portion 30 protrudes from a rear face of the bottom plate 112 as shown in FIG. 8, and the lamp socket receiving portion 30 is upwardly open due to the opening 20 formed through the upper face portion 11 and the inclined portion 13 even when the lamp socket receiving portion 30 is inserted into the extracting hole 114 formed through the bottom plate 112.

In the illustrated exemplary embodiment, the lamp socket 50 is received in the lamp socket receiving portion 30 by the top-down method. A lower portion of the lamp socket 50 protrudes from the bottom plate 112, and the power input terminal 58 of the lamp socket 50 is exposed in the front direction. The power output terminal 57 is exposed to an area above the socket body 51, as shown in FIG. 8.

As described above, the lamp guide frame 5 and the lamp socket 50 are coupled to form one connecting module 7, and the connecting module 7 electrically connects the lamp 2 and the power supply board 150 to each other.

Referring again to FIG. 1, the backlight assembly 100 may further include a reflective plate 120, an optical member 170 and a middle frame 180.

The reflective plate 120 upwardly reflects light traveling downwardly from the lamp 2. The reflective plate 120 is fixed to upper ends of the third sidewall 115 and the fourth sidewall 117, and disposed along the third sidewall 115, the bottom plate 112 and the fourth sidewall 117. In one exemplary embodiment, a top surface of the receiving container 110 may include protrusions which are coupled to corresponding fixing members of the reflective plate 120, as illustrated in FIG. 1.

The reflective plate 120 is a single and continuous member, and may directly contact the third sidewall 115, the bottom plate 112 and the fourth sidewall 117. Portions of the reflective plate 120 may not be disposed adjacent to or facing the first sidewall 111 and/or the second sidewall 113, such as shown in FIG. 8. A portion of an edge of the reflective plate 120 proximate to the first sidewall 111 and the second sidewall 113 may be spaced apart from the first sidewall 111 and the second sidewall 113. The portion of the edge of the reflective plate 120 may be a part of a stepped portion of the overall edge, and may be spaced apart from the first sidewall 111 and the second sidewall 113 so as to not overlap with the extraction holes 114 disposed in the receiving container 110.

The optical member 170 is disposed over the lamps 2 to diffuse and condense the light originating from the lamps 2. The optical member 170 may include, but is not limited to, a light-diffusing plate 171, a light-diffusing sheet 173 and light-condensing sheets 175 successively disposed. Edge portions of the optical member 170 may be disposed on the upper face portion 11 of the lamp guide frame 5, as shown in FIG. 8.

The middle frame 180 includes a support frame 181 and a side frame 185. The support frame 181 may have a substantially rectangular frame shape, and compresses peripheral edge portions of the optical member 170. The side frame 185 upwardly and downwardly extends from a side face of the support frame 181, and is coupled to the sidewall portion of the receiving container 110.

Figure 9:
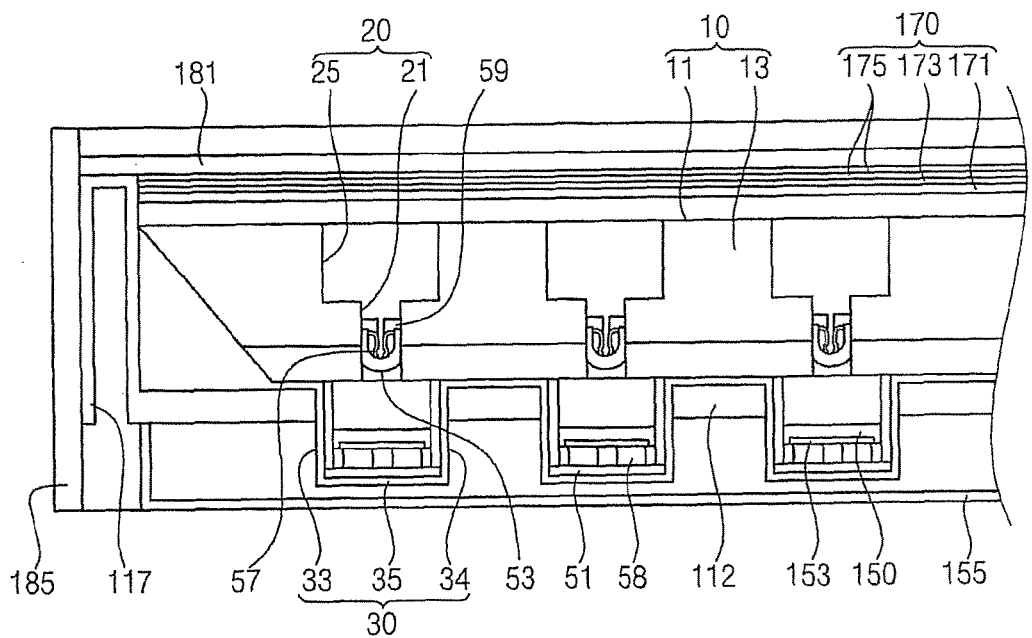
FIG. 9 is a cross-sectional view taken along line III-III' in FIG. 1.

FIG. 9 is a cross-sectional view taken along line III-III' in FIG. 1.

Referring to FIGS. 1, 8 and 9, the backlight assembly 100 may further include the power supply board 150. The power supply board 150 supplies the lamp-driving power to the electrode part 4 of the lamp 2 through the power supply member 56 (FIG. 6). The power supply board 150 is disposed on the rear face of the bottom plate 112. Protrusions corresponding to the lamp socket receiving portions 30 protruding from the rear face of the bottom plate 112, and overlapping with the extraction holes 114 of the receiving container 110 may be formed at an edge portion of the power supply board 150 proximate to the first sidewall 111 and/or the second sidewall 113, such as to form an uneven shape of the edge portion of the power supply board 150, as shown in FIG. 1.

As illustrated in FIGS. 8 and 9, connection terminals 153 are formed on rear faces of the protrusions of the power supply board 150. The power supply board 150 outputs a lamp-driving voltage to the connection terminal 153. Alternatively, the connection terminal 153 may be formed on an upper face and/or upper and lower faces of the power supply board 150, according to the shape of the power supply member 56.

The protrusions of the power supply board 150 are inserted into the lamp socket receiving portion 30 protruding from the rear face of the bottom plate 112. The protrusions are inserted into the lamp socket 50 from the front direction and toward the rear wall 31 of the lamp socket receiving portion 30, substantially parallel along the rear face of the bottom plate 112, and disposed on the power input terminal 58. The power input terminal 58 is elastically deformed to make contact with the connection terminal 153. When the power input terminal 58 contacts the connection terminal 153, the power supply board 150 and the lamps 2 are electrically connected to each other.

Referring again to FIGS. 1, 8 and 9, the backlight assembly 100 may further include a protecting case 155 covering and protecting the power supply board 150, and shielding the power supply board 150 from inflow and outflow of electromagnetic waves. The protecting case 155 may cover a rear surface of the power supply board 150, such as overlapping a whole of the rear surface. The protecting case 155 may include a bottom portion and sidewall portions, where the sidewall portions face edge faces of the power supply board 150. The backlight assembly 100 may include a plurality of protecting cases 155, such as corresponding to a number of the power supply board 150.

According to the backlight assembly 100 and a method of manufacturing the backlight assembly of the present invention, a separate alignment plate fixing and aligning the lamp sockets 50 is advantageously omitted to reduce the number of parts. In addition, a method of coupling the lamp guide frame 5 to the receiving container 110, a method of coupling the lamp socket 50 to the lamp guide frame 5, and a method of coupling the lamp 2 to the lamp socket 50 are performed by the top-down method. Advantageously, the backlight assembly may be easily assembled, and assembly time may be reduced.

Figure 10:
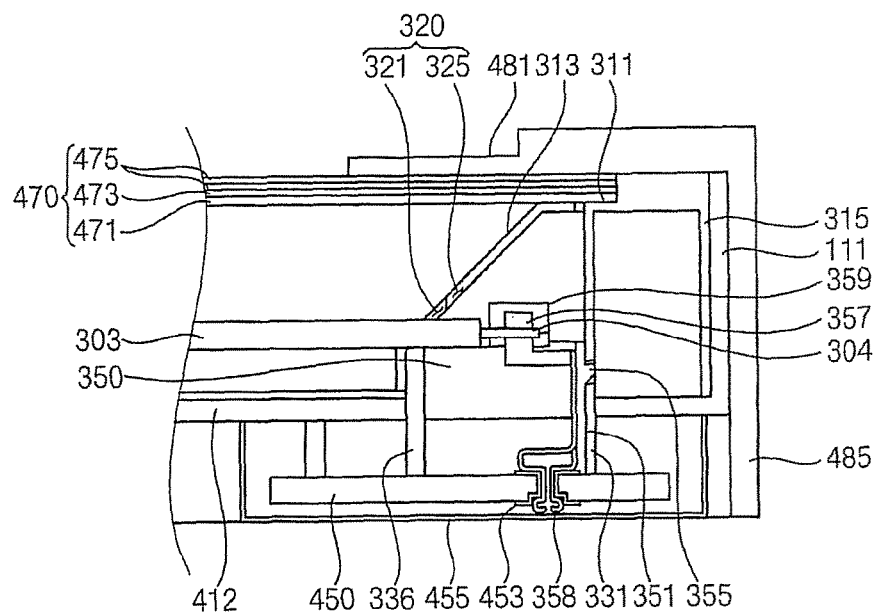
FIG. 10 is a cross-sectional view illustrating another exemplary embodiment of a backlight assembly according to the present invention.

FIG. 10 is a cross-sectional view illustrating another exemplary embodiment of a backlight assembly according to the present invention.

Figure 11:
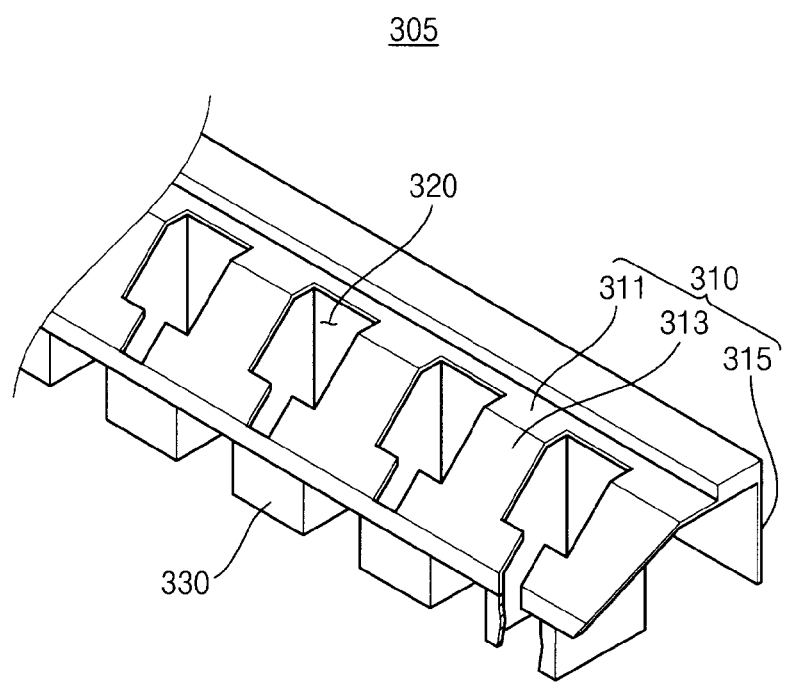
FIG. 11 is a perspective view illustrating an exemplary embodiment of a lamp guide frame illustrated in FIG. 10.
Figure 12:
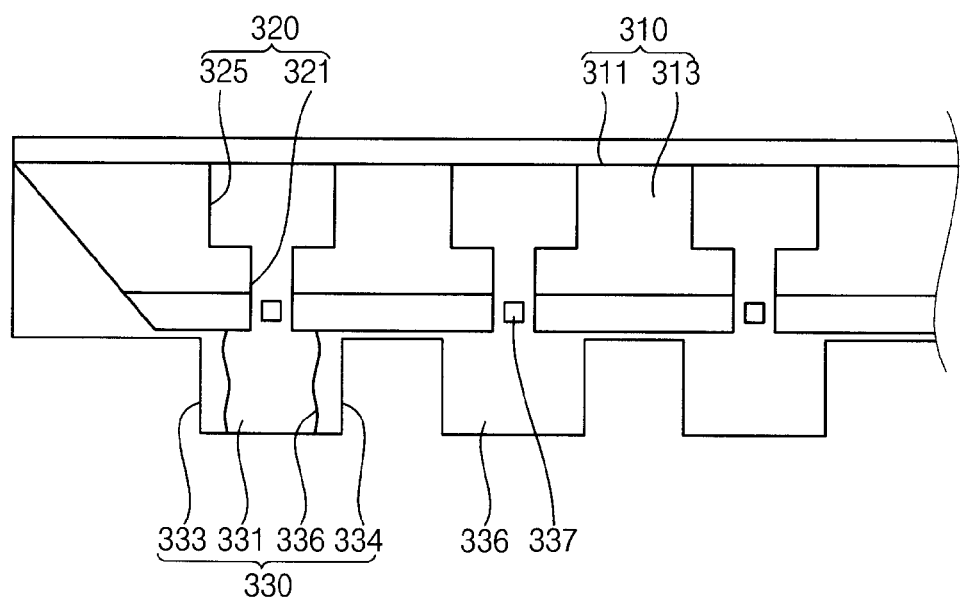
FIG. 12 is a side view illustrating the lamp guide frame illustrated in FIG. 11.

Referring to FIG. 10, a backlight assembly 400 is substantially the same as the backlight assembly 100 illustrated in FIGS. 1 through 9, except for a shape of a lamp guide frame 305, a shape of a lamp socket 350 and a shape of a power supply board 450. Thus, corresponding reference numerals will be used to refer to corresponding elements. FIG. 11 is a perspective view illustrating an exemplary embodiment of a lamp guide frame illustrated in FIG. 10. FIG. 12 is a side view illustrating the lamp guide frame illustrated in FIG. 11.

A receiving container of the backlight assembly 400 includes a bottom plate 412 and a sidewall portion. The sidewall portion includes a first sidewall 111, a second sidewall, a third sidewall and a fourth sidewall. A lamp includes a lamp tube 303 and an electrode part 3044. The lamp socket is coupled to the electrode part 304 formed at the end portion of the lamp tube 303, and supplies lamp-driving power to the electrode part 304.

The lamp socket includes a socket body and a power supply member 356. In an exemplary embodiment, the socket body may include plastic and/or formed by casting. The socket body may have a substantially hexahedral shape. A lamp guide groove 353 is formed on a first portion of the socket body to guide an end portion of the lamp. A terminal opening is formed a second portion of the socket body and is opened to a side of the socket body.

The power supply member 356, which may include metal, supplies the lamp-driving power provided from a power supply board 450, to the electrode part 304 of the lamp. The power supply member 356 is inserted into the terminal opening to be fixed in the socket body. The power supply member 356 includes a power output terminal 357 and a power input terminal 358.

The lamp socket may further include a socket cap 359 which is removably inserted into the terminal opening to upwardly and downwardly move over the socket body. Before the electrode part 304 of the lamp is inserted into the power output terminal 357, the socket cap 359 is left unpushed, e.g., in an upward position. When the electrode part 304 of the is inserted into the power output terminal 357, the socket cap 359 is downwardly pushed by an external force and compresses the power output terminal 357 to secure contact between the power output terminal 357 and the electrode part 304.

Each lamp socket receiving portion 330 downwardly protrudes towards the lower side of the frame body 310, and may define a lower face of the frame body 310. Each lamp socket receiving portion 330 closes an opening 320 at the lower side and the outer side of the frame body 310, such that the lamp socket receiving portion 330 is considered to be disposed around an associated opening 320 of the frame body 310. The lamp socket receiving portion 330, the opened inner side of the frame body 310 and the opened upper side of the frame body 310 define a receiving space of the opening 320 which receives the lamp socket inserted into the opening 320. The lamp socket receiving portion 330 is formed as single, continuous and indivisible unit with remaining portions of the frame body 310. The opening 320 includes a first opening 321 and a second opening 325

The backlight assembly 400 may further include a protecting case 455 covering and protecting the power supply board 450, and shielding the power supply board 450 from inflow and outflow of electromagnetic waves.

The backlight assembly 400 may further include an optical member 470 disposed over the lamps to diffuse and condense the light originating from the lamps. The optical member 470 may include, but is not limited to, a light-diffusing plate 471, a light-diffusing sheet 473 and light-condensing sheets 475 successively disposed. Edge portions of the optical member 470 may be disposed on the upper face portion 311 of the lamp guide frame 305, as shown in FIG. 10. The backlight assembly 400 may also include a middle frame including a support frame 481 and a side frame 485. The support frame 481 may have a substantially rectangular frame shape, and compresses peripheral edge portions of the optical member 470. The side frame 485 upwardly and downwardly extends from a side face of the support frame 481, and is coupled to the sidewall portion of the receiving container.

Referring to FIGS. 11 and 12, the lamp guide frame 305 includes a frame body 310 which may include an upper face portion 311, an inclined portion 313 and a side face portion 315. The lamp guide frame 305 is substantially the same as the lamp guide frame 5 illustrated in FIGS. 2 to 4 except that a lamp socket receiving portion 330 does not include a bottom wall, but instead further includes a front wall 336, and a catching hole 337 is formed through a rear wall 331 of the lamp socket receiving portion 330. Thus, corresponding reference numerals will be used to refer to corresponding elements, and any further description will be omitted.

The structure of the lamp socket receiving portion 330 may be modified according to the structure of a lamp socket 350 received in the lamp socket receiving portion 330, as described above. In one exemplary embodiment, the lamp socket receiving portion 330 may not include a bottom wall supporting the lamp socket 350. The lamp socket receiving portion 330 further includes a front wall 336. The front wall 336 faces the rear wall 331, and is connected to sidewalls 333 and 334.

In order to securely fix the lamp socket 350 to the lamp socket receiving portion 330, the catching hole 337 into which a catching protrusion 355 formed on the lamp socket 350 is inserted is formed through the rear wall 331 of the lamp socket receiving portion 330. A plurality of the catching hole 337 may be formed through the sidewalls 333 and/or 334 of the lamp socket receiving portion 330.

Figure 13:
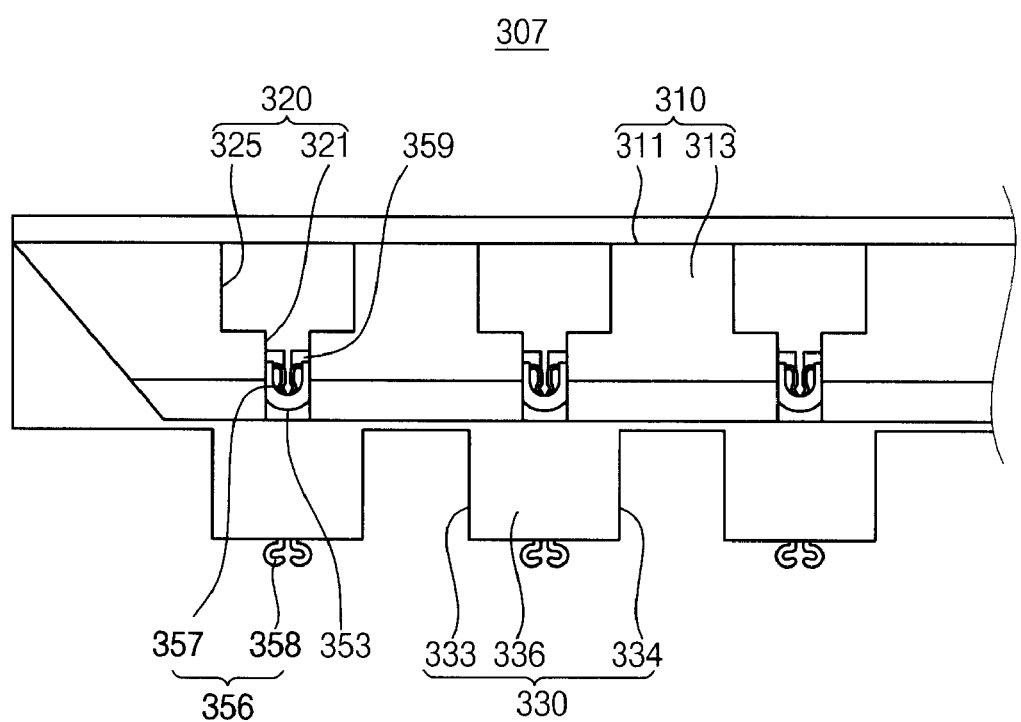
FIG. 13 is a side view illustrating an exemplary embodiment of a connecting module including the lamp guide frame illustrated in FIG. 12.

FIG. 13 is a side view illustrating a connecting module including the lamp guide frame illustrated in FIG. 12.

Referring to FIG. 13, a connecting module 307 includes the lamp guide frame 305 illustrated in FIG. 12, and is substantially the same as the connecting module 7 illustrated in FIGS. 5 to 7 except for a modified structure of the lamp socket 350. Thus, corresponding reference numerals will be used to refer to corresponding elements, and any further description will be omitted.

The lamp socket 350 is substantially the same as the lamp socket 50 illustrated in FIG. 6 except that a socket body 351 is both upwardly and downwardly open, but not open from the front direction. A power input terminal 358 of a power supply member 356 protrudes toward a lower side of the socket body 351 and has a hook shape. Thus, any further description will be omitted.

Referring again to FIG. 10, a connection hole is formed through a power supply board 450. The connection hole is formed to completely penetrate from an upper face to a lower face of the power supply board 450, and a connection terminal 453 may be formed an upper face of the power supply board 450 near the connection hole, an inner face of the connection hole and a lower face of the power supply board 450 near the connection hole.

The power supply board 450 is disposed on a rear face of a bottom plate 412, such as being coupled in a down-top direction. The power input terminal 358 of the lamp socket 350 is inserted into the connection hole to make contact with the connection terminal 453.

According to the exemplary embodiment in FIGS. 10-13, a rear side of the lamp socket 350 is compressed to be extracted from the lamp socket receiving portion 330 from a bottom direction since there is no bottom wall of the lamp socket receiving portion 330. Advantageously, when the connecting module 307 is repaired or the power supply board 450, such as an inverter is repaired, a disassembly process may be easily performed.

According to the lamp guide frame, the connecting module including the lamp guide frame, the backlight assembly including the lamp guide frame and the method of manufacturing the backlight assembly, the number of the backlight assemblies may be reduced, and an assembly process for the backlight assembly may be advantageously simplified, such as including assembly including a top-down method.

Furthermore, the lamp guide frame, the connecting module including the lamp guide frame, and the backlight assembly including the lamp guide frame may be employed to simplify a structure and enhance assemblability of a backlight assembly to improve productivity.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A lamp guide frame comprising:
   a frame body guiding end portions of a plurality of lamps, each lamp including a lamp socket disposed at each of ends of the lamp;

a plurality of openings extending to an end portion in a width direction of the frame body, the plurality of openings being arranged in a longitudinal direction of the frame body; and a plurality of lamp socket receiving portions, each of the lamp socket receiving portions comprising a rear wall and sidewalls protruding from a lower face of the frame body and partially around an associated opening, the each of the lamp socket receiving portion forming a receiving space receiving the lamp socket inserted into the associated opening, and each of the lamp socket receiving portions being open in the width direction of the frame body, wherein the frame body and the plurality of lamp socket receiving portions collectively define a single and continuous member, and wherein the associated opening and the receiving space formed by the lamp socket receiving portion collectively define a continuous opening.

2. The lamp guide frame of claim 1, wherein the frame body comprises:
an upper face portion;
an inclined portion downwardly extending from a first edge of the upper face portion in a width direction of the frame body, the inclined portion forming an obtuse angle with respect to the upper face portion; and
a side face portion downwardly extending from a second edge of the upper face portion being opposite to the first edge in the width direction of the upper face portion, the side face portion spaced apart from and facing the lamp socket receiving portion.

3. The lamp guide frame of claim 2, wherein each of the plurality of the openings extends from the upper face portion of the frame body to a lower end of the inclined portion of the frame body.

4. The lamp guide frame of claim 3, wherein each of the plurality of the openings includes:
a first opening extended from the lower end of the inclined portion and formed through the inclined portion, the first opening having a first width in the longitudinal direction of the frame body greater than a diameter of the lamp and smaller than a width of the lamp socket in the longitudinal direction of the frame body, and
a second opening extended from the upper face portion to the inclined portion, and having a second width greater than the width of the lamp socket, the second opening being connected to and continuous with the first opening.

5. The lamp guide frame of claim 3, wherein the each of the lamp socket receiving portions comprises:
the rear wall protruding from a lower face of the upper face portion substantially in parallel with the side face portion; and
the sidewalls protruding from a lower face of the inclined portion and facing each other, and connected to side edges of the rear wall, the opening being between the sidewalls.

6. The lamp guide frame of claim 5, wherein the each of the lamp socket receiving portions further comprises a bottom wall connected to a lower end of the rear wall and lower ends of the sidewalls, the bottom wall supporting the lamp socket, and the each lamp socket receiving portion is open in a direction toward the inclined portion.

7. The lamp guide frame of claim 5, wherein the each of the lamp socket receiving portions further comprises a front wall facing the rear wall, and connected to the sidewalls, and the lamp socket receiving portion is downwardly open.

8. The lamp guide frame of claim 5, further comprising a coupling part formed on at least one of the rear wall and the sidewalls of the lamp socket receiving portions to fix the lamp socket to the lamp socket receiving portion.

9. A connecting module comprising:
a lamp guide frame comprising:
a frame body,
a plurality of lamp socket receiving portions, each of which comprises a rear wall and sidewalls, protrudes from a lower face of the frame body and defines a receiving space, each lamp socket receiving portion being open in a direction in which the lamp socket receiving portion is coupled to a power supply board providing lamp-driving power; and
a plurality of openings, each of which being extended through the frame body respectively corresponding to the lamp socket receiving portions and exposing the receiving space of the lamp socket receiving portion,
wherein the frame body and the plurality of lamp socket receiving portions collectively define a single and continuous member, and wherein each of the plurality of openings and the receiving space of the lamp socket receiving portion collectively define a continuous opening; and
a lamp socket comprising:
a socket body received in the each lamp socket receiving portion through an associated opening of the lamp guide frame; and
a power supply member coupled to the socket body, the power supply member including a power output terminal detachably coupled to an electrode part of a lamp inserted into the associated opening, and a power input terminal exposed from the socket body in the coupling direction of the power output terminal and the electrode part of the lamp.

10. The connecting module of claim 9, wherein the frame body comprises:
an upper face portion including a stepped portion;
an inclined portion extending from a first edge of the upper face portion in a width direction of the frame body, the inclined portion forming an obtuse angle with respect to the upper face portion, the associated opening extending to a lower end of the inclined portion; and
a side face portion downwardly extending from a second edge of the upper face portion which is opposite to the first edge and in the width direction of the frame body, the side face portion facing the lamp socket receiving portion.

11. The connecting module of claim 10, wherein the each lamp socket receiving portion comprises:
the rear wall protruding from a lower face, of the upper face portion substantially in parallel with the side face portion, the rear wall being more downwardly protrusive than the side face portion and the inclined portion; and
the sidewalls protruding from a lower face of the inclined portion and facing each other, and connected to side edges of the rear wall, the associated opening being between the sidewalls.

12. The connecting module of claim 11, wherein the each lamp socket receiving portion exposes the power input terminal in a direction toward the inclined portion.

13. The connecting module of claim 11, wherein the each lamp socket receiving portion downwardly exposes the power input terminal.

14. A backlight assembly comprising:
a receiving container comprising a bottom plate, a plurality of extracting holes extended through an edge portion of the bottom plate, and a sidewall portion extending from the edge portion of the bottom plate;

a lamp guide frame comprising a frame body disposed along the sidewall portion, and a plurality of lamp socket receiving portions, each of which comprises a rear wall and sidewalls, protrudes from a lower face of the frame body and is inserted into an associated extracting hole and is open to an upper side of the frame body by an opening formed through the frame body;

a plurality of lamp sockets, each comprising a socket body downwardly received in the lamp socket receiving portion from the upper side of the frame body, and a power supply member including a power output terminal exposed to the upper side of the frame body and a power input terminal exposed to the socket body protruding from a rear face of the bottom plate of the receiving container; and a plurality of lamps each comprising a lamp tube, an end portion of which is disposed over the socket body, and an electrode part formed at the end portion and detachably inserted into the power output terminal of a lamp socket.

15. The backlight assembly of claim 14, wherein the frame body comprises:

an upper face portion substantially in parallel with the bottom plate of the receiving container, the upper face portion including a stepped portion;

an inclined portion extending from a first edge of the upper face portion in a width direction of the frame body, a lower end of the inclined portion being disposed on the bottom plate of the receiving container, the opening extending from the upper face portion to the lower end of the inclined portion; and a side face portion extending from a second edge of the upper face portion opposite to the first edge of the upper face portion and facing the sidewall portion.

16. The backlight assembly of claim 15, wherein the each lamp socket receiving portion comprises the rear wall protruding from a lower face of the upper face portion substantially in parallel with the side face portion, the rear wall being inserted into the associated extracting hole, and the sidewalls protruding from a lower face of the inclined portion and facing side faces of the socket body and inserted into the associated extracting hole, further comprising a power supply board including a connection terminal disposed on the rear face of the bottom plate and contacting the power input terminal of the lamp socket.

17. The backlight assembly of claim 16, wherein the connection terminal is inserted into the lamp socket receiving portion from a direction facing the rear wall of the each lamp socket receiving portion and contacting the power input terminal of the lamp socket.

18. The backlight assembly of claim 16, wherein the power input terminal of the lamp socket protrudes toward a lower side of the lamp socket receiving portion and is inserted into a connection hole of the power supply board including the connection terminal.

19. The backlight assembly of claim 15, further comprising a coupling protrusion formed on the side face portion of the frame body, and a coupling hole formed through the sidewall portion of the receiving container, the coupling protrusion being inserted into the coupling hole.

20. A method of manufacturing a backlight assembly, comprising:

downwardly positioning a lamp guide frame comprising a frame body including openings and a plurality of lamp socket receiving portions each of which comprises a rear wall and sidewalls, protrudes from a lower face of the frame body and is upwardly open by an associated opening of the plurality of openings disposed through the frame body, in a receiving container from an upper side of the receiving container, so that the lamp socket receiving portions are inserted into extracting holes formed through a bottom plate of the receiving container;

downwardly inserting a lamp socket comprising a socket body and a power supply member including a power output terminal exposed to an upper side of the frame body from the socket body, and a power input terminal exposed to a side of the socket body, into an each of the lamp socket receiving portions from the upper side of the frame body; and downwardly coupling a lamp comprising a lamp tube and an electrode part formed at an end portion of the lamp tube, to the lamp socket from the upper side of the frame body, so that the electrode part is detachably coupled to the power output terminal of the lamp socket.

21. The method of claim 20, further comprising positioning a power supply board including a connection terminal disposed on an edge portion and outputting lamp-driving power, on a rear face of the bottom plate of the receiving container, so that the connection terminal makes contact with the power input terminal of the lamp socket which is exposed through the lamp socket receiving portion protruding from the rear face of the bottom plate.

* * * * *